United States Patent
Weber et al.

(10) Patent No.: US 7,110,830 B2
(45) Date of Patent: Sep. 19, 2006

(54) MICROPROCESSOR SYSTEM AND METHOD FOR PROTECTING THE SYSTEM FROM THE EXCHANGE OF MODULES

(75) Inventors: Jochen Weber, Markgroeningen (DE); Klaus Schneider, Ludwigsburg (DE); Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 10/798,216

(22) Filed: Mar. 10, 2004

(65) Prior Publication Data
US 2004/0236438 A1   Nov. 25, 2004

(30) Foreign Application Priority Data
Mar. 14, 2003   (DE) ............................... 103 11 250

(51) Int. Cl.
| | |
|---|---|
| G05B 19/18 | (2006.01) |
| G05B 19/42 | (2006.01) |
| G06F 12/00 | (2006.01) |
| G06F 12/14 | (2006.01) |
| G06F 12/16 | (2006.01) |
| G06F 13/00 | (2006.01) |
| G06F 13/28 | (2006.01) |

(52) U.S. Cl. ............... 700/5; 700/2; 700/3; 700/86; 700/87; 711/100; 711/163; 711/170; 709/208; 709/209; 709/210; 709/211; 712/32; 712/33; 712/34; 714/28; 714/3

(58) Field of Classification Search ............... 700/2, 700/3, 4, 5, 19, 20, 86, 87, 88, 82; 709/208, 709/209, 210, 211; 710/110; 712/32, 33, 712/34; 714/28, 30; 711/100, 163, 170
See application file for complete search history.

(56) References Cited

U.S. PATENT DOCUMENTS

| | | | | |
|---|---|---|---|---|
| 5,329,579 | A | * | 7/1994 | Brunson ................. 379/88.26 |
| 5,689,654 | A | * | 11/1997 | Kikinis et al. ............. 710/303 |
| 6,138,236 | A | * | 10/2000 | Mirov et al. ................ 726/26 |
| 2003/0116621 | A1 | * | 6/2003 | Duncan .................... 235/379 |
| 2003/0212830 | A1 | * | 11/2003 | Greenblat .................. 709/251 |

* cited by examiner

*Primary Examiner*—Ramesh Patel
(74) *Attorney, Agent, or Firm*—Kenyon & Kenyon LLP

(57) ABSTRACT

A microprocessor system includes a plurality of modules, among them a microprocessor and at least one storage module for storing the code and/or data for the microprocessor. Stored, in a non-changeable manner, in at least one of the modules, referred to as exchange-protected module, is a serial number of this module. A control module is configured to receive a data value specified by the at least one serial number and to block, at least partially, the function of the microprocessor system if the received data value does not match an expected data value encoded in the control module.

15 Claims, 2 Drawing Sheets

MICROPROCESSOR SYSTEM AND METHOD FOR PROTECTING THE SYSTEM FROM THE EXCHANGE OF MODULES

FIELD OF THE INVENTION

The present invention relates to the prevention of manipulations of microprocessor systems, in particular in engine-control devices for motor vehicles.

BACKGROUND INFORMATION

Such devices are generally configured as microprocessor systems having a microprocessor, a program and main memory for the microprocessor and one or a plurality of interfaces for the communication with sensors and actuators on the engine. By manipulating the control program of the processor it is possible to influence the behavior of the engine so as to achieve a higher engine output, for example. Power-output limitations, which are required to prevent possibly harmful overload situations of the engine or the drive train or which are mandated by law, may be circumvented in this manner. Consequently, there is a need for technology that makes unauthorized manipulations of such microprocessor systems impossible or at least makes them more complicated in a deterring manner.

One technique that may be utilized for this purpose is cementing the modules of such a microprocessor system. However, it has become apparent that no adhesive agent is available that cannot be dissolved in some manner. Another disadvantage of cementing is that it not only makes unauthorized manipulations more difficult, but repairs of the microprocessor system as well.

SUMMARY OF THE INVENTION

The exemplary embodiment of the present invention provides a microprocessor system and a method for protecting such a system from the exchange of a module which make an unauthorized exchange much more difficult yet do not impair the repair ease of the system. The degree of difficulty is so high that the benefit obtainable by the manipulation in most does not justify the effort to be expended for this purpose, so that the manipulation makes no sense from an economical point of view.

The exemplary embodiment of the present invention is based on a microprocessor system having a plurality of modules, among them a microprocessor and at least one storage module for storing the code and data for the microprocessor. At least one of the modules, which is also referred to as exchange-protected module, stores a serial number of this module in a non-changeable manner. During the manufacture of microprocessors these may be provided with a serial number that cannot be changed in the finished microprocessor. This serial number is able to be queried with the aid of software and clearly identifies each microprocessor. Non-volatile memory modules, in particular flash memories, having serial numbers are available as well.

The exemplary embodiment of the present invention provides for a data value to be calculated in the microprocessor with the aid of the serial number of the at least one exchange-protected module, using a predefined algorithm, and for the data value to be forwarded to the control module. The control module compares this received data value to an expected data value encoded in the control module. If both match, the serial number of the exchange-protected module is correct and the microprocessor system is allowed to shift into normal operation. If the two data values do not match, this means that the exchange-protected module has been exchanged without authorization and that the function of the microprocessor system must be blocked at least partially so as to prevent that processes are executed in a faulty manner due to the exchange, such faults possibly leading to damage to a device controlled by the microprocessor system, especially a motor vehicle engine.

The control module itself may be identified by a serial number as well, and the expected data value is identical to this serial number. That means that the algorithm for calculating this data value is stipulated specifically on the basis of the serial numbers of the at least one exchange-protected module and the control module, in such a way that the result is the serial number of the control module.

It is useful to select a non-volatile memory module as exchange-protected module in which program codes to be executed by the microprocessor are stored, for example, or parameter sets that the microprocessor utilizes in the execution of its tasks.

So-called flash memories are often used in modern microprocessor system, in particular for storing such parameter sets. These electrically overwritable memories are then able to be expediently protected from an exchange if the their write access is protected by a password.

An exchange protection may also be useful for the microprocessor of the system itself, in particular in those cases where it constitutes part of a one-chip microcomputer together with a program memory.

The control module may be configured to induce the microprocessor to query the serial number of each exchange-protected module, to calculate the specified data value therefrom and to transmit it to the control module. This makes it difficult for an unauthorized person to prevent the check of the serial numbers of exchange-protected modules by modifying the control program of the microprocessor.

Unauthorized modifications of the control program are also made more difficult in that information required by the microprocessor to calculate the specified data value is stored at least partially in the program memory integrated in the microprocessor. As a result, this information is much more difficult to access by an unauthorized person than data stored in an external storage module, for example.

The data may include program instructions to be executed within the framework of a boot procedure, i.e., program instructions that are automatically executed upon each start-up of the microprocessor system.

Another security feature is to configure the control module in such a way that it blocks the function of the microprocessor system, at least partially, in those cases as well where the specified data value is not received during a predefined time interval. That means that, even if an unauthorized person, by modifying the program of the microprocessor, manages to prevent the microprocessor from transmitting a data value to the control module on the basis of which the latter could detect an exchange of a protected module, the normal operation of the microprocessor system is prevented nevertheless.

DETAILED DESCRIPTION

Figure 1:
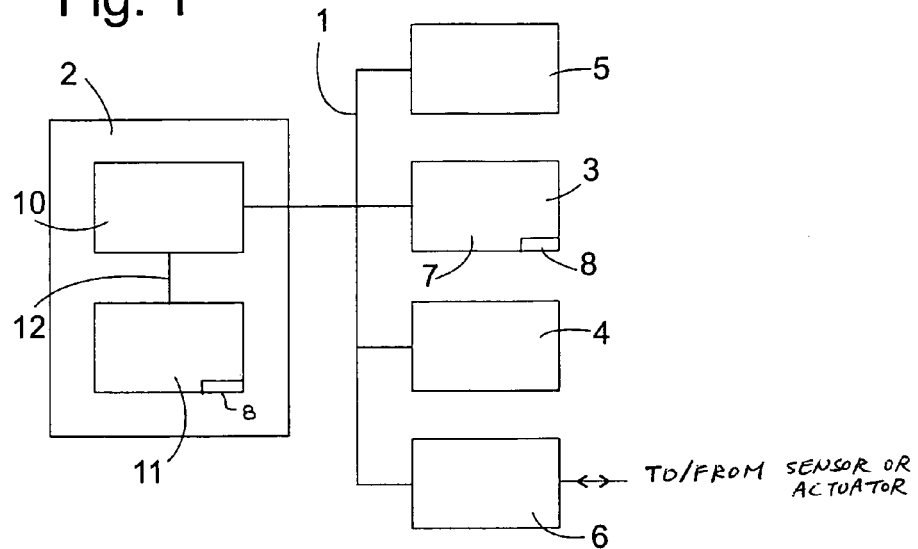
FIG. 1 shows a block diagram of a first development of a microprocessor system according to the exemplary embodiment of the present invention.

FIG. 1 shows a block diagram of an engine-control device, which is meant to constitute an example of a microprocessor system according to the exemplary embodiment of the present invention. Connected to a bus 1 on a printed circuit board are a one-chip microcomputer 2; one or a plurality of storage modules, each of which is identified by an individual serial number, only one flash memory 3 being shown in the figure for the sake of simplification; a control module 4 which may be implemented as ASIC, for instance; a write-read storage module 5; and an interface 6 for the communication with sensors and actuators (not shown) of the engine to be controlled. Modules 2, 3, 4, 5 are each formed by IC's, which are separate from each other. Integrated in the chip of microcomputer 2 are a microprocessor 10 and a read-only program memory 11. An internal bus 12 via which microprocessor 10 and program memory 11 communicate is entirely contained within chip 2, so that an unauthorized person may not read off the contents of program memory 11 outside of the microcomputer chip. Program memory 11 includes, in particular, program commands for a boot procedure of the control device.

Flash memory 3 has a main memory area 7, addressable in a conventional manner, into which the manufacturer of the engine-control device has written program instructions and parameter fields for microprocessor 10, and whose instructions are processed after successful implementation of the boot procedure. This main memory area 7 is addressable in the conventional manner so as to be read via bus 1. Furthermore, the flash memory has a temporary memory location 8 into which the manufacturer of flash memory 3 has already written a serial number specific to each individual memory of a given type. The content of temporary memory location 8 is also readable via bus 1, but the format of the address signals required to read out temporary memory location 8 may be different from that for addressing main memory location 7. For example, for the readout of temporary memory location 8 it may be required that a password be first applied to flash memory 3 via bus 1. This excludes the possibility of replacing flash memory 3 with a pin-compatible memory module delivered ex factory without a serial number, in which only the serial number of flash memory 3 has been copied into a conventionally addressable memory location. Therefore, flash memory 3 may only be replaced with a module of the same type, but having a different serial number.

Figure 2:
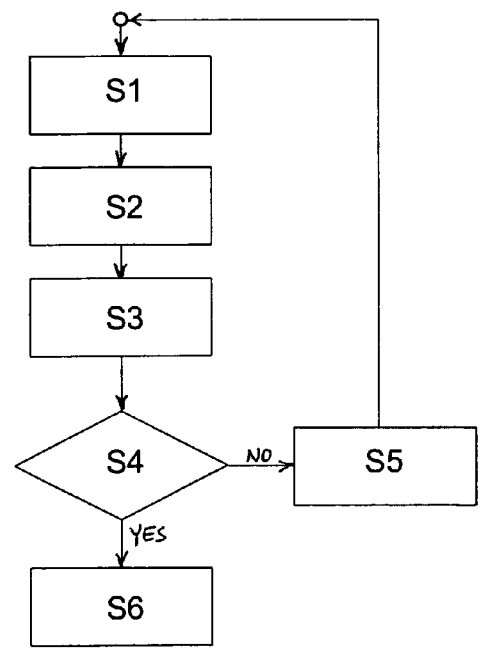
FIG. 2 shows a flow chart of an operating sequence in the microprocessor system of FIG. 1.

The method of operation of the microprocessor system is explained on the basis of the flow chart of FIG. 2. Microprocessor 10 executes a boot procedure during each start-up. This boot procedure initializes interface 6 and also sensors and actuators possibly connected thereto, for example, and it is used to ascertain whether manipulations have taken place in the microprocessor system while it was turned off. Program commands that serve this latter purpose are stored in program memory 11 and are executed at the beginning of the boot procedure, prior to a first-time accessing of program commands that are stored outside one-chip microcomputer 2.

To check whether an unauthorized manipulation has taken place, microprocessor 10, in step S1 of FIG. 2, reads the serial number of all exchange-protected modules, in this example that of flash memory 3, and also the individual serial number of one-chip microcomputer 2 stored in program memory 11, for instance. In step S2, it links the read serial numbers by specified computing steps likewise stored in program memory 11. These computing steps are stipulated such that they result in a code number stored in control module 4 (provided the read serial numbers are correct).

The program commands to be executed in the linking are stored in program memory 11 and are the same for all microprocessor systems of a production run. In the simplest case, the match between the result of the linking and the code number is achieved by reading, during installation of the device, the serial numbers of the installed modules to be protected from an exchange, by calculating the result of the linking and entering it as code number in the control module.

However, a randomly selected data value, such as a serial number of control module 4, which is stored in control module 4 already prior to installation, may be the code number as well. To ensure a match in this case between the linking result and the code number, at least one randomly selectable parameter, which guarantees the desired result of the linking, must be entered into the linking. The value of such a parameter is specified during installation of the device on the basis of the serial numbers of the particular modules and entered in a memory, preferably flash memory 3.

In the simplest case, the linking may consist of adding up the serial numbers of the exchange-protected modules and the parameters, the parameters being selected such that the code number is the result of the addition. Of course, any other, more complicated linkages, which may also utilize a plurality of parameters, are conceivable as well.

The result of the linking is sent to the control module in step S3. It evaluates in step S4 whether the received value matches the code number. If this is the case, the microprocessor, in step S6, continues with the processing of its control program and finally shifts into normal operation; otherwise, control module 4 transmits a reset signal to microprocessor 10 with the result that it is retained in an endless loop of steps S1 to S3 and never reaches normal operation.

Figure 3:
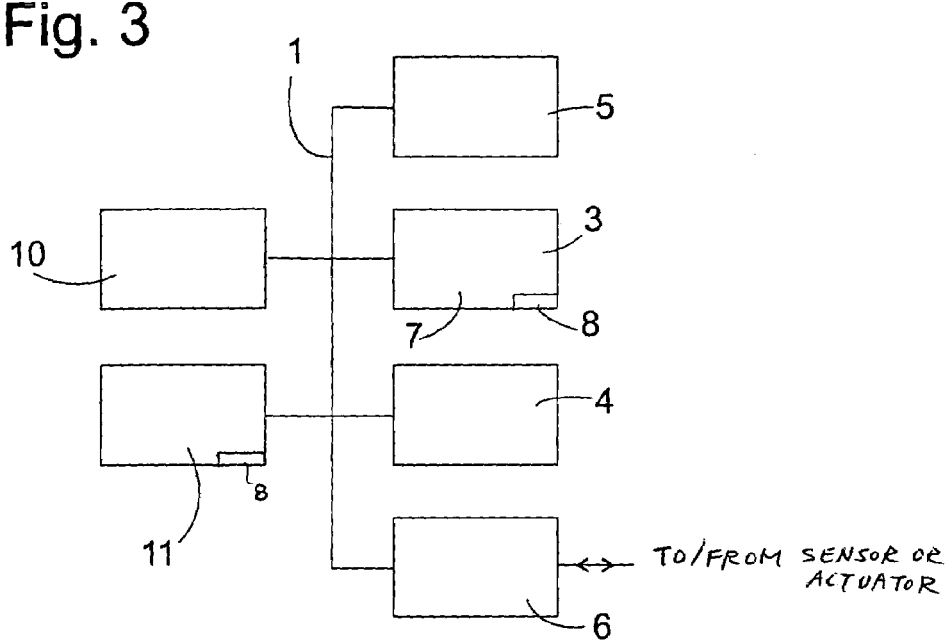
FIG. 3 shows a block diagram of a second development of a microprocessor system according to the exemplary embodiment of the present invention.

The second development of the microprocessor system shown in FIG. 3 essentially differs from that of FIG. 1 by microprocessor 10 and program memory 11 being implemented on two separate chips. Program memory 11, like flash memory 3, is exchange-protected by a serial number that has been individually specified by the memory manufacturer. Microprocessor 10 may have a separate serial number here and may likewise be exchange-protected, but this is of minor importance since an exchange of microprocessor 10 for another one of the same type does not affect the function of the microprocessor system.

Figure 4:
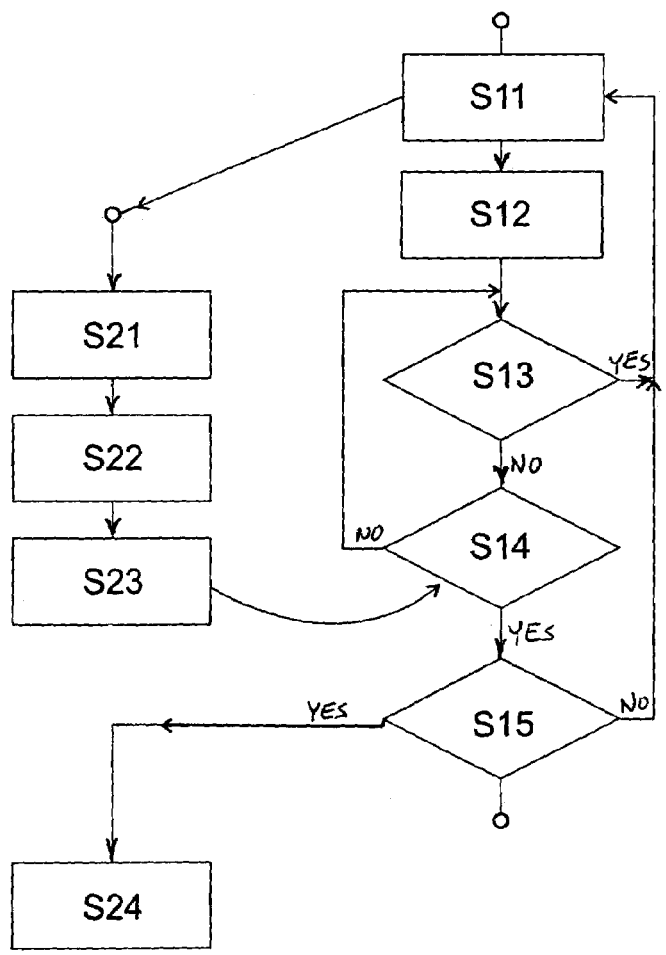
FIG. 4 shows a flow chart of an operating sequence in the system of FIG. 3.

Program memory 11 and microprocessor 10 communicate here via joint bus 1, so that it cannot be excluded that an unauthorized person reads out the program code of memory 11. The functioning method of this development is described with the aid of the flow chart of FIG. 4. When the system is put into operation, control module 4 generates a reset pulse for microprocessor 10 in step S11. Subsequently, in step S12, an internal timing device of control module 4 is set to start. At the same time, microprocessor 10 begins to execute a reset routine whose program commands are stored in program memory 11. In step S21, the reset routine encompasses the reading of the serial numbers of the exchange-protected modules; in step S22, the linking in the same manner as described before in connection with step S2; and in step S23, the transmitting of the result to control module 4.

While microprocessor 10 implements the reset routine, the control module checks whether a signal from the timing device is present that indicates that a predefined time period has elapsed since it has been started (S13). This time period is longer than the time the microprocessor requires for steps S21 to S23. For as long as the time period has not elapsed, control module 4 ascertains in step S14 whether the result of the linking by the microprocessor has arrived. If this is not the case, it continues to wait, if necessary until the predefined time period has passed. Once the time interval has elapsed, it returns to step 11 and transmits a new reset pulse to the microprocessor.

If the linking result arrives in time, it is compared in step S15 to the code number of the control module. If there is a match, control module 4 takes no further steps and the microprocessor shifts into normal operation S24. If there is no match, control module 4 returns to step S11 again and transmits a reset pulse. In this manner, microprocessor 10 is retained in an endless loop of steps S21 to S23 not only when control module 4 receives a faulty linking result due to the exchange of an exchange-protected module, but also in those cases where a manipulation or an exchange of a module has had the result that microprocessor 10 is no longer able to execute steps S21 to S23 during start-up.

What is claimed is:

1. A microprocessor system having a plurality of modules, comprising:
   a microprocessor;
   at least one storage module for storing at least one of the code and data for the microprocessor, the at least one storage module being referred to as an exchange-protected module and storing a serial number for the at least one storage module in a non-changeable manner; and
   a control module to receive a data value specified by the serial number and to at least partially block a function of the microprocessor system if the received data value does not match an expected data value encoded in the control module.

2. The microprocessor system of claim 1, wherein the control module differs from the exchange-protected module, and has a serial number the control module, and the expected data value is identical to the serial number for the control module.

3. The microprocessor system of claim 1, wherein the at least one exchange-protected module is a non-volatile storage module.

4. The microprocessor system of claim 3, wherein the storage module includes a password-protected flash memory.

5. The microprocessor system of claim 1, wherein the exchange-protected module includes a one-chip microcomputer, which includes the microprocessor together with a program memory.

6. The microprocessor system of claim 1, wherein a plurality of exchange-protected modules are present, and wherein the control module is configured to induce the microprocessor to query the serial number of each exchange-protected module to calculate the corresponding specified data value and to transmit the corresponding specified data value to the control module.

7. The microprocessor system of claim 5, wherein information required by the microprocessor to calculate the specified data value is at least partially stored in the program memory.

8. The microprocessor system of claim 7, wherein the information includes program instructions that are to be executed within the framework of a boot procedure.

9. The microprocessor system of claim 1, wherein the control module is configured to also at least partially block the function of the microprocessor system when the specified data value is not received during a predefined time interval.

10. A method for protecting a microprocessor system from unauthorized exchange of exchange-protected modules of the microprocessor system, comprising:
    reading a serial number of at least one exchange-protected module of the microprocessor system;
    determining a data value specified by the at least one serial number;
    transmitting the determined data value to a control module; and
    at least partially blocking the function of the microprocessor system when the control module detects a difference between the determined data value and an expected data value encoded in the control module.

11. The method of claim 10, wherein the data value is determined in a determining operation with an algorithm, which has been specified during assembly of the microprocessor system based on the serial number of the at least one exchange-protected module.

12. The method of claim 11, wherein the algorithm has additionally been specified based on a serial number of the control module, whereby the data value determined in the determining operation is the serial number of the control module.

13. The method of claim 11, wherein the method is implemented in each case during start-up of the microprocessor system or periodically during operation.

14. The method of claim 10, wherein the determining operation encompasses at least one arithmetical or logical operation and is executed by the microprocessor of the microprocessor system.

15. The method of claim 10, wherein the function of the microprocessor system is at least partially blocked when the specified data value has not been received during a predefined time interval.

* * * * *